Aug. 13, 1963          A. K. GAST, JR           3,100,649
           MANDREL FOR CUTTING METAL SHADE ROLLERS
Filed March 30, 1962                        2 Sheets-Sheet 1
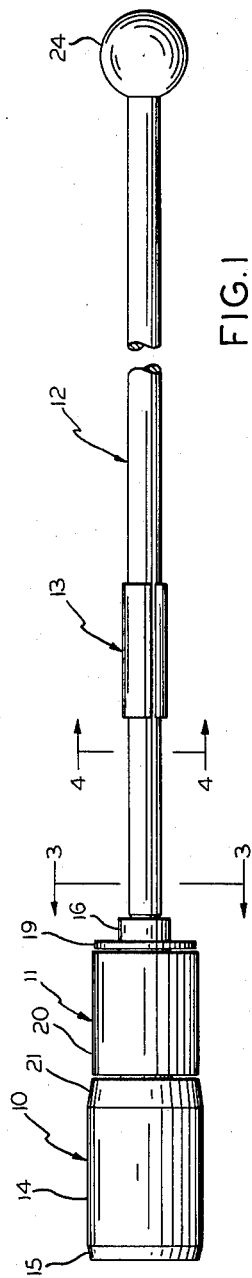
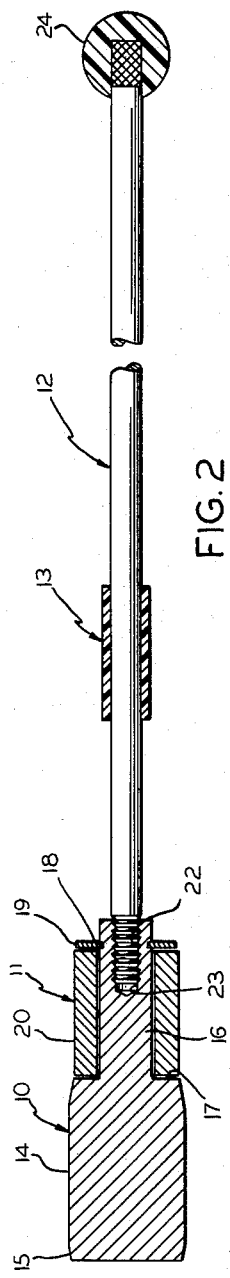
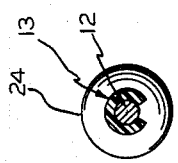
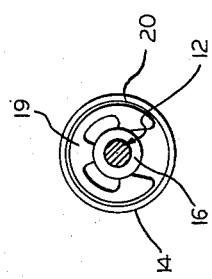
INVENTOR.
ALBERT K. GAST, JR
BY
Marzall, Johnston, Cook & Root
ATTORNEYS Aug. 13, 1963  A. K. GAST, JR  3,100,649
MANDREL FOR CUTTING METAL SHADE ROLLERS
Filed March 30, 1962  2 Sheets-Sheet 2

INVENTOR.
ALBERT K. GAST, JR
BY
Marzall, Johnston, Cook & Root
ATTORNEYS

United States Patent Office 3,100,649
Patented Aug. 13, 1963

3,100,649
MANDREL FOR CUTTING METAL SHADE ROLLERS
Albert K. Gast, Jr., St. Joseph, Mich., assignor to Star Shade Cutter Company, St. Joseph, Mich., a partnership
Filed Mar. 30, 1962, Ser. No. 183,814
10 Claims. (Cl. 279—1)

This invention relates in general to a mandrel for use in the cutting of tubular members, and more particularly to a mandrel for use in cutting of metal shade rollers. The mandrel is adapted to be used where tubular members are mounted in a rotatably driven chuck and the cutting element is positioned adjacent the chuck and adapted to be swung against the tubular member held thereby.

While the present invention will be shown and described in the cutting of metal shade rollers in connection with a shade cutting machine, it should be appreciated that the present invention may be employed otherwise to aid in the cutting of hollow tubular members.

Heretofore, it has been customary that window shades have been generally mounted on solid wooden shade rollers and have been made in standard sizes. This necessitates the retailer to custom-cut many of the shades and shade rollers to a size desired by a particular installation. These retailers usually have their own shade cutting machines, such as of the types disclosed in Gast Patent 1,964,984 issued on July 3, 1934, Gast Patent 2,326,293 issued on August 10, 1943, and Gast et al. Patent 2,888,048 issued on May 26, 1959. The cutting machines disclosed in these patents are adapted to quickly and easily perform the necessary operations for cutting a shade to size. One thing in common in all of these machines is that the shade and shade roller are usually gripped by a chuck that is rotatably mounted so that the shade and shade roller may be rotated and a cutting element swung thereagainst to cut the shade and shade roller. However, these shade cutting machines are not equipped to cut hollow metal shade rollers which are now coming into use in view of the scarcity of wood for making wooden shade rollers.

It is therefore an object of this invention to provide a mandrel for use with ordinary shade cutting machines where it is necessary to cut a hollow metal shade roller.

Another object of this invetnion is in the provision of a mandrel for use in cutting of tubular members that may be rotatably driven by a chuck or the like and wherein a cutting member is available to be swung against the tubular member.

Still another object of this invention resides in the provision of a mandrel for use in the cutting of hollow cylindrical members in a suitable cutting machine, wherein a rotatably driven chuck is employed to grip and hold the member and which will also hold the mandrel in position.

A further object of the present invention is to provide a mandrel for use in the cutting of hollow metal shade rollers, wherein the mandrel includes a backup portion adapted to be received within the roller and in alignment with a rotatably driven chuck which supports the roller, and a freely rotatable roller to be aligned with a cutting member that may be swung against the shade roller.

A still further object of the present invention is in the provision of a mandrel for use in the cutting of hollow metal shade rollers wherein the shade rollers are mounted in a rotatably driven chuck and a cutting element is positioned adjacent the chuck and adapted to swing against the shade roller held thereby, and wherein the mandrel includes a backup member received within the shade roller and in alignment with the chuck and a freely rotatable roller mounted adjacent the backup member and adapted to be received within the shade roller and in alignment with the cutting element, and an elongated handle extending from the backup member and roller for manipulation of same.

Other objects, features and advantages of the invention will be apparent from the following detailed disclosure taken in conjunction with the accompanying sheets of drawings, wherein like reference numerals refer to like parts, in which:

FIG. 1 is a plan view of the mandrel according to the present invention;

FIG. 2 is a longitudinal sectional view taken through the mandrel according to the present invention, and showing some parts in elevation;

FIG. 3 is a transverse sectional view, taken substantially along line 3—3 of FIG. 1;

FIG. 4 is a transverse sectional view taken substantially along line 4—4 of FIG. 1;

Figure 7:
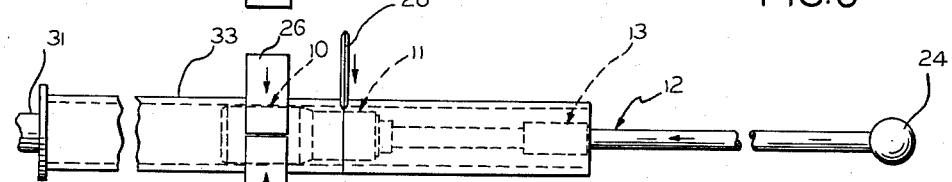
Figure 8:
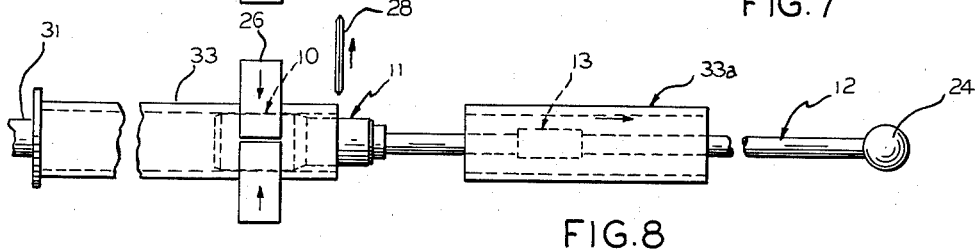

FIG. 7 is a partially diagrammatic view of certain elements of the shade cutting machine, and showing the second step of using the mandrel of the present invention and particularly illustrating the positioning of the mandrel within the shade roller; and FIG. 8 is a partially diagrammatic view of certain elements of the shade cutting machine and showing the mandrel of the present invention, and the third step to be taken after the shade roller has been cut, and illustrating particularly how the cut-off excess shade roller portion is removed.

Referring to the drawings, and particularly to FIGS. 1 and 2, the mandrel of the present invention includes generally a backup member 10, a roller 11 arranged adjacent the backup member, an elongated handle 12 for supporting on the end thereof the roller and backup member, and a split sleeve 13 frictionally slidable along the handle 12.

The backup member 10 includes a main cylindrical surface 14 sized to be received snugly within the tubular member to be cut so that when the tubular member is chucked, the surface 14 will directly back up the chucked portion and prevent it from collapsing. Essentially, the backup member 14 and the tubular member or hollow metal shade roller form a single piece when chucked so that the backup member and shade roller rotate together. While the backup member 14 is shown herein to be solid, it will be appreciated that it need not be solid as long as a strong cylindrical surface is presented for engagement with the inner surface of the metal shade roller. The outer end of the backup member 10 is slightly tapered at 15 to facilitate insertion of the backup member into the open end of a hollow shade roller.

Extending from one end of the backup member 10 is a diametrically reduced shaft portion 16 which rotatably receives thereon the roller 11. The shaft 16 which is cylindrical is concentrically aligned with the axis of the backup member 10 and defines at the juncture an annular shoulder 17. The roller 11 is of an axial length less than the shaft 16, and maintained on the shaft by means of an annular groove 18 formed in the shaft and receiving thereon a locking clip 19.

The roller 11 is provided with an external surface 20 of a diametrical dimension slightly less than the diametrical dimension of the main cylindrical surface 14 of the backup member 10 in order to prevent binding of the mandrel within the shade roller after the shade roller has been cut. For the cutting element will be in alignment with the roller 11 so that when the cut has been made the blade of the cutter will engage the roller whereby the roller will rotate relative to the backup member 10 and prevent excessive wear of the cutting blade which would be caused if the surface against which the cutting blade acted would not move therewith. When a metal shade roller is cut, a burr is formed along the internal surface, and the difference between the diametrical dimension of the roller 11 and the backup member 10 is such as to preclude the binding of this burr against the roller and inhibiting removal of the mandrel from the roller.

To further facilitate the removal of the mandrel from a cut shade roller, a gradually sloping surface or taper 21 is provided on the end of the backup member 10 adjacent to the roller 11, tapering from the dimension of the cylindrical surface 14 down to the dimension of the roller cylindrical surface 20. This taper permits the camming out of the burred end of a cut shade roller during removal of the mandrel from the shade roller.

The handle 12 is elongated and of a size sufficient to insert the mandrel within a hollow shade roller a substantial distance, and therefore elongated and protruding from the end of the shaft 16. The external diametrical dimension of the handle 12 is preferably less than the diametrical dimension of the shaft 16, and the end of the handle 12 engaging the shaft 16 is preferably threaded at 22 to be received in a tapped bore 23 formed in the free end of the shaft 16. However, the handle 12 may be connected to the shaft in any other suitable manner. And while the handle 12 is shown as having a cylindrical cross section, it should be appreciated that it may have a cross section of any desirable shape. The outer end of the handle is provided with a spherical plastic knob 24, secured to the handle in any suitable manner and for engagement by the hand for manipulation of the mandrel. The maximum dimension of the knob 24 is somewhat less than the roller 11 in order to facilitate the removal of a cut piece of hollow metal roller from the mandrel.

Inasmuch as it is necessary to determine the distance of insertion of the mandrel within a hollow metal shade roller in order to properly align the backup member with the chuck and the roller with the cutting element, the split sleeve 13 is provided. This sleeve is of a predetermined length and it may be made of plastic or any other suitable material so that it frictionally grips the handle 12 and may be removed therealong and frictionally held in place. The use of this sleeve will be described in the operation of the mandrel.

Figure 5:
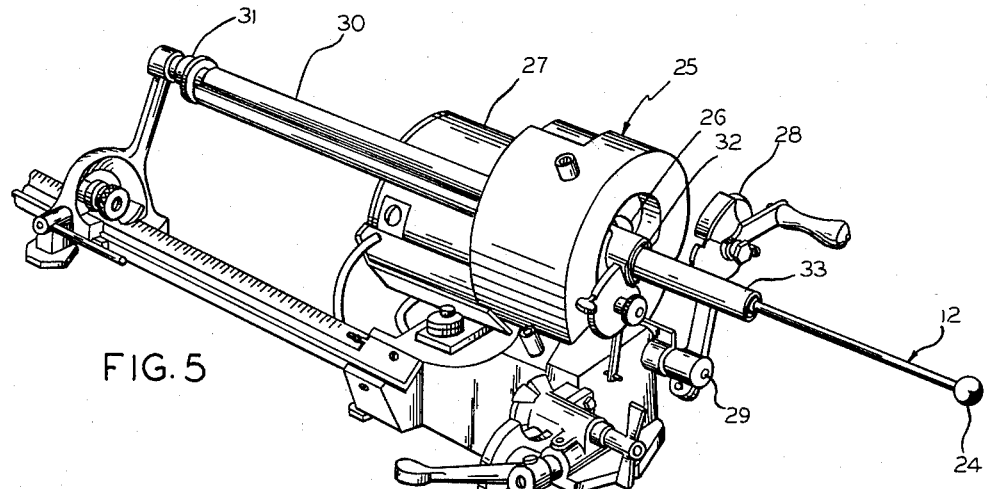
FIG. 5 is a perspective view of a shade cutting machine, and illustrating the present invention in use therewith.
Figure 6:
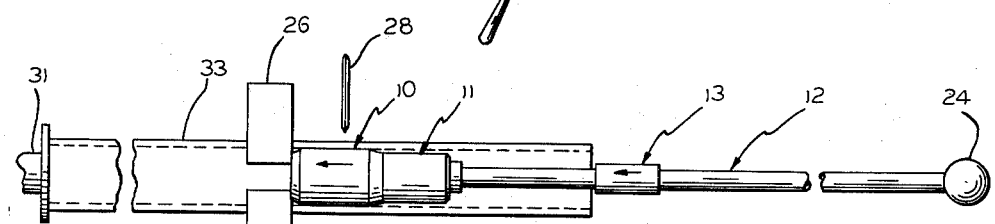
FIG. 6 is a diagrammatic view of some of the shade cutting machine elements, together with the mandrel of the present invention, and illustrating the first step of using the mandrel wherein it is necessary to determine the distance the mandrel is to be inserted within a shade roller for the cutting operation.

Referring now to FIG. 5, a shade cutting machine is illustrated of the type disclosed in the aforementioned United States Patent 2,888,048, for purposes of illustrating the use of the mandrel of the present invention. FIGS. 6, 7 and 8 illustrate the steps taken in the use of the mandrel, and FIG. 7 is illustrative of the positioning of the mandrel as it is shown in FIG. 5 when the cutting of the hollow shade roller is about to take place. As already mentioned, the mandrel may well be used with other shade cutting machines.

The shade cutting machine shown in FIG. 5 may be generally designated by the numeral 25 and includes generally a chuck 26 that may be opened and closed for gripping of a shade and shade roller, and which is rotatably driven by gearing mechanism connected to the electric motor 27. A shade roller cutting element 28 is shown in position adjacent to the chuck and which is pivotal about a pivot shaft 29 to be swung toward and away from the shade roller. More detail in operation of the shade cutting machine may be found in the Patent 2,888,048. However, none of the details of this machine forms any part of the invention. As shown in FIG. 5, a shade 30 is mounted in the machine and gripped by the chuck 26 for rotation therewith, the other end being supported on a bracket 31. The shade 30 includes shade material or fabric 32 and the shade roller 33. And the shade 30 as shown in FIG. 5 has already had the shade material cut and removed from the shade roller thereby readying the shade for cutting of the shade roller 33.

In operation of the mandrel of the present invention, the shade is positioned in the machine with a left-hand end supported by the bracket 31 and the right-hand end extending through the chuck wherein the desired amount to be removed from the shade is already calculated and the bracket 31 is properly adjusted. The mandrel is then placed in parallel relation along the shade so that the free end of the backup member 10 engages the right-hand face of the chuck 26 as is illustrated in FIG. 6. The sleeve 13 is then adjusted along the handle 12 so that its left-hand edge aligns with the outer end of the shade roller 33 as also is shown in FIG. 6. The mandrel is then inserted within the open end of the shade roller until the right-hand edge of the sleeve 13 aligns with the free end of the shade roller 33 as is shown in FIG. 7, whereby automatic alignment of the backup member 10 with the chuck 26 is accomplished and automatic alignment of the roller 11 with the cutting element 28 is also accomplished. The length of the sleeve 13 is such as to provide this automatic placement of the mandrel within the shade roller, and it should be appreciated that the length of the sleeve 13 would be such as to coact with the particular shade cutting machine with which the mandrel is to be used. This length would depend on the lateral spacing between the chuck and cutting element. The chuck 26 is then closed to grip the shade and to grip the shade onto the backup member 10 thereby effectively uniting the backup member 10 and the shade roller 33 so that they rotate together with the chuck 26. After the shade material or fabric is cut and removed, the cutting of the shade roller itself may then be accomplished by swinging the cutting element 28 against the shade roller while the shade roller is being rotatably driven by the chuck 26. As the cutting blade or element 28 cuts through the shade roller, it will ultimately engage the roller 11 on the mandrel and then stop rotation of the roller. Thus the roller serves to reduce or practically eliminate the wear on the blade that may be caused by any frictional movement between the roller and blade inasmuch as the blade is capable of stopping the roller while the mandrel continues to rotate. Moreover, the roller serves to alert the operator that the cutting operation has been completed since the excess or cut-off portion of the shade roller, as indicated by the numeral 33a in FIG. 8, will also have substantially stopped rotation. The excess or cut-off portion 33a may then be removed from the mandrel by sliding it off the handle 12 and over the knob 24. Should the cut-off portion 33a cling to the mandrel collar or roller 11, it can be removed therefrom after the machine has been stopped and the chuck 26 opened by pushing the mandrel further inward of the shade roller so that the roller is completely within the confines thereof, thereby aligning the thin handle 12 of the mandrel with the cut-off portion to permit it to be easily removed therefrom. The mandrel may then be removed from the shade roller 33, by wiggling it back and forth so that the burr formed on the end of the shade roller by the cutting action will be cammed out of position by action of the tapered portion 21 on the backup member.

It should further be appreciated that the mandrel of the present invention could be employed wherein shade rollers may be constructed of plastic or any other suitable material wherein the shade roller is hollow like a hollow metal shade roller. Further, the elements of the mandrel with the exception of the sleeve 13 and the knob 24 may also be made of plastic or any other suitable material, but preferably they are made of metal. Further, the sleeve 13 and the knob 24 could be made of metal, but it is cheaper to make the same of plastic.

It will be understood that modifications and variations may be effected without departing from the scope of the novel concepts of the present invention, but it is understood that this application is to be limited only by the scope of the appended claims.

The invention is hereby claimed as follows:

1. A mandrel for use in the cutting of tubular members wherein the tubular members are mounted in a rotatably driven chuck and a cutting element is positioned adjacent the chuck and adapted to swing against a tubular member held thereby, said mandrel comprising a backup member adapted to be arranged within said tubular member and aligned with said chuck, a roller adapted to be arranged within said tubular member and aligned with said cutting element, and means for inserting and removing the backup member and roller, from said tubular member.

2. A mandrel for use in the cutting of tubular members wherein the tubular members are mounted in a rotatably driven chuck and a cutting element is positioned adjacent the chuck and adapted to swing against a tubular member held thereby, said mandrel comprising a backup member adapted to be arranged within said tubular member and aligned with said chuck, said backup member taking the shape of the inside of the tubular member and sized to snugly fit therein, a roller adapted to be arranged within said tubular member and aligned with said cutting element, said roller being slightly smaller than the inside of the tubular member, and means for inserting and removing the backup member and roller from said tubular member.

3. A mandrel for use in the cutting of tubular members wherein the tubular members are mounted in a rotatably driven chuck and a cutting element is positioned adjacent the chuck and adapted to swing against a tubular member held thereby, said mandrel comprising a backup member adapted to be arranged within said tubular member and aligned with said chuck, said backup member taking the shape of the inside of the tubular member and sized to snugly fit therein, a roller adapted to be arranged within said tubular member and aligned with said cutting element, said roller being slightly smaller than the inside of the tubular member, and an elongated handle extending from said backup member and roller for manipulating same.

4. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, and means for inserting and removing the backup member and roller from said tubular member.

5. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, said roller having a cylindrical surface sized under the surface of the backup member, and means for inserting and removing the backup member and roller from said tubular member.

6. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, said roller having a cylindrical surface sized under the surface of the backup member, and an elongated handle extending from said backup member and roller for manipulating same.

7. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, said roller having a cylindrical surface sized under the surface of the backup member, a tapered portion on the end of the backup member adjacent the roller tapering from the cylindrical surface of the backup member to the cylindrical surface of the roller, and an elongated handle extending from said backup member and roller for manipulating same.

8. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, said roller having a cylindrical surface sized under the surface of the backup member, said roller being directly adjacent to the backup member and freely rotatable about the axis of the backup member, and an elongated handle extending from said backup member and roller for manipulating same.

9. A mandrel for use in the cutting of tubular members wherein the tubular members are mounted in a rotatably driven chuck and a cutting element is positioned adjacent the chuck and adapted to swing against a tubular member held thereby, said mandrel comprising a backup member adapted to be arranged within said tubular member and aligned with said chuck, said backup member taking the shape of the inside of the tubular member and sized to snugly fit therein, a roller adapted to be arranged within said tubular member and aligned with said cutting element, said roller being slightly smaller than the inside of the tubular member, an elongated handle extending from said backup member and roller for manipulating same, and means on said handle for determining the proper positioning of the mandrel in the tubular member.

10. A mandrel for use in the cutting of hollow cylindrical members wherein the cylindrical members are mounted in a rotatably driven chuck and a cutting element is positioned adjacent the chuck and adapted to swing against a cylindrical member held thereby, said mandrel comprising a backup member having a cylindrical surface dimensioned slightly under the inside diameter of a cylindrical member to be cut and adapted to be received within said cylindrical member in alignment with said chuck, a roller mounted adjacent the backup member and adapted to be arranged within the cylindrical member and in alignment with said cutting element, said roller having a cylindrical surface sized under the surface of the backup member, an elongated handle extending from said backup member and roller for manipulating same, and a sleeve slidable along said handle for determining the positioning of the mandrel within the hollow cylindrical member.

References Cited in the file of this patent

UNITED STATES PATENTS

| | | |
|---|---|---|
| 1,964,984 | Gast | July 3, 1934 |
| 2,326,293 | Gast | Aug. 10, 1943 |
| 2,358,838 | Wadell | Sept. 26, 1944 |
| 2,888,048 | Gast et al. | May 26, 1959 |

FOREIGN PATENTS

| | | |
|---|---|---|
| 828,596 | Great Britain | Feb. 17, 1960 |